(12) United States Patent
Fujisaku et al.

(10) Patent No.: US 6,478,069 B1
(45) Date of Patent: Nov. 12, 2002

(54) MANUFACTURING METHOD AND APPARATUS FOR OPTICAL DISC

(75) Inventors: Osamu Fujisaku; Hironobu Nishimura; Yutaka Matsumoto, all of Saitama; Hideo Kobayashi, Tokyo, all of (JP)

(73) Assignee: Origin Electric Company, Limited, Tokyo (JP)

( * ) Notice: Subject to any disclaimer, the term of this patent is extended or adjusted under 35 U.S.C. 154(b) by 0 days.

(21) Appl. No.: 09/497,216

(22) Filed: Feb. 3, 2000

(30) Foreign Application Priority Data

Feb. 3, 1999 (JP) .......................... 11-026274
May 31, 1999 (JP) .......................... 11-150960
Nov. 18, 1999 (JP) .......................... 11-327828

(51) Int. Cl.⁷ ..................... B32B 35/00; B23P 19/04
(52) U.S. Cl. ..................... 156/584; 156/344; 29/239; 29/426.5
(58) Field of Search .................. 156/230, 182, 156/241, 247, 344, 584; 428/64.4, 64.7; 29/239, 426.5

(56) References Cited

U.S. PATENT DOCUMENTS 5,720,989 A * 2/1998 Asai ........................... 425/192
5,851,251 A 12/1998 Kondo et al.
5,897,743 A * 4/1999 Fujimoto et al. ............ 156/584
6,117,284 A * 9/2000 Mueller ................. 204/192.27

FOREIGN PATENT DOCUMENTS

JP     8-23941      3/1996
JP    10-283682    10/1998

* cited by examiner

Primary Examiner—Richard Crispino
Assistant Examiner—Cheryl N. Hawkins
(74) Attorney, Agent, or Firm—McDermott, Will & Emery

(57) ABSTRACT

A method and apparatus for manufacturing an optical disc, a transparent disc substrate having two relatively wide-area surfaces thereof on at least one of which an information is recorded and a first reflective film is formed onto a dummy disc having similar relatively wide-area surfaces thereof on at least one which another information is recorded and a second reflective film having a light semi-transmissive characteristic is formed are bonded via an adhesive layer and, thereafter, an external force is applied between the dummy disc and the disc substrate through an integrated center hole penetrated through the dummy disc and the disc substrate at center positions thereof to peel off the dummy disc at a first interface between the dummy disc and the second reflective film thereof In a preferred embodiment, a partial peeling off of the dummy disc from the second reflective film is carried out through a mechanical force and a complete peeling off of the dummy disc from the second reflective film is carried out through a supply of a compressed air to the first interface between the partially peeled dummy disc and the second reflective film.

10 Claims, 14 Drawing Sheets

MANUFACTURING METHOD AND APPARATUS FOR OPTICAL DISC

BACKGROUND OF THE INVENTION:

a) Field of the Invention

The present invention relates to a manufacturing method and apparatus for an optical disc having a plurality of recording layer surfaces.

b) Description of the Related Art

Recently, such a high density recording medium as an optical disc called a digital versatile disc (hereinafter, abbreviated as DVD) has been developed as a product of a technique which increases a recording capacity on recording surfaces.

Furthermore, there is an increasing tendency on the recording capacity of the optical disc to highly densify the recording capacity. For example, in a four-layer recording structure, the optical disc called DVD-18 on which a recording has been made for each of two layers thereof from both surfaces has the recording capacity of 17 GB (Gigabytes).

Japanese Patent Application First (unexamined) Publication No. Heisei 10-283682 published on Oct. 23, 1998 and Japanese Patent Application Second (examined) Publication No. Heisei 8-23941 published on Mar. 6, 1996 exemplify previously proposed manufacturing methods of the multi-layer optical discs such as the DVD-18 as described above.

In each of the previously proposed manufacturing methods described in the above-described Japanese Patent Application Publications, manufacturing steps of either of its recording surfaces include: a step of peeling off an interface between a stamper and an adhesive layer, the stamper being used for each layer, a step of transcribing the information recorded by means of pit rows on the adhesive layer formed on the interface; and a step of forming a reflective film on the adhesive layer.

SUMMARY OF THE INVENTION

Since, in the previously proposed manufacturing method, the steps using the stamper by plural number of times are continued serially, a time length of the whole manufacturing steps (in a whole manufacturing line) is accordingly extended.

In addition, it is necessary to carry out strict control over the steps using the stamper in a clean room. It is not always efficient to provide the steps using the stamper alternately with steps of bonding mutually the layers which are different in qualities.

It is, therefore, an object of the present invention to provide an improved manufacturing method and apparatus for the optical disc in which no stamper is used and a step of forming a reflective film on an adhesive layer after the step of transcribing the information is deleted and which are appropriate for a mass production of the optical disc.

According to one aspect of the present invention, there is provided with a method for manufacturing an optical disc, comprising: bonding a transparent disc substrate having two relatively wide-area surfaces thereof on at least one of which a first information is recorded and a first reflective film is formed onto a dummy disc having the similar relatively wide-area surfaces thereof on at least one which a second information is recorded and a second reflective film is formed via an adhesive layer; and applying an external force between the dummy disc and the disc substrate through an integrated center hole penetrated through the dummy disc and the disc substrate at center positions thereof to peel off the dummy disc at a first interface between the dummy disc and the second reflective film thereof.

According to another aspect of the present invention, there is provided with an apparatus for manufacturing an optical disc comprising: a bonding device to bond a transparent disc substrate having two relatively wide-area surfaces thereof on at least one of which a first information is recorded and a first reflective film is formed onto a dummy disc having the similar relatively wide-area surfaces thereof on at least one of which a second information is recorded and a second reflective film is formed via an adhesive layer; and an external force applying device to apply an external force between the dummy disc and the disc substrate through an integrated center hole penetrated through the dummy disc and the disc substrate at center positions thereof to peel off the dummy disc at a first interface between the dummy disc and the second reflective film thereof.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

First Embodiment

FIGS. 1 through 6 show cross sectional views of an optical disc manufactured by a method of manufacturing the optical disc in a first preferred embodiment according to the present invention.

FIGS. 1 through 6 illustrate first through sixth steps in the first embodiment of the manufacturing method of the optical disc.

Figure 1:
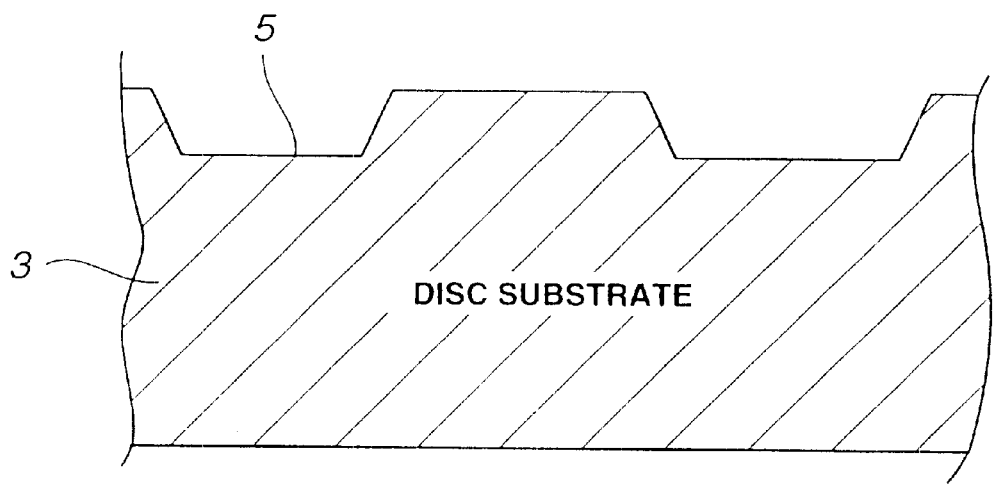
FIG. 1 is a partially cross sectional view of a disc substrate for explaining a first preferred embodiment of a manufacturing method (a first step) for an optical disc according to the present invention.

At the first step, as shown in the cross section in FIG. 1, a pit 5 (as a whole, a plurality of pits) which is a recess in a miniature spiral or concentric circular shape to record a bit information is formed on a disc substrate 3 made of a transparent characteristic plastic material such as a polycarbonate.

Figure 2:
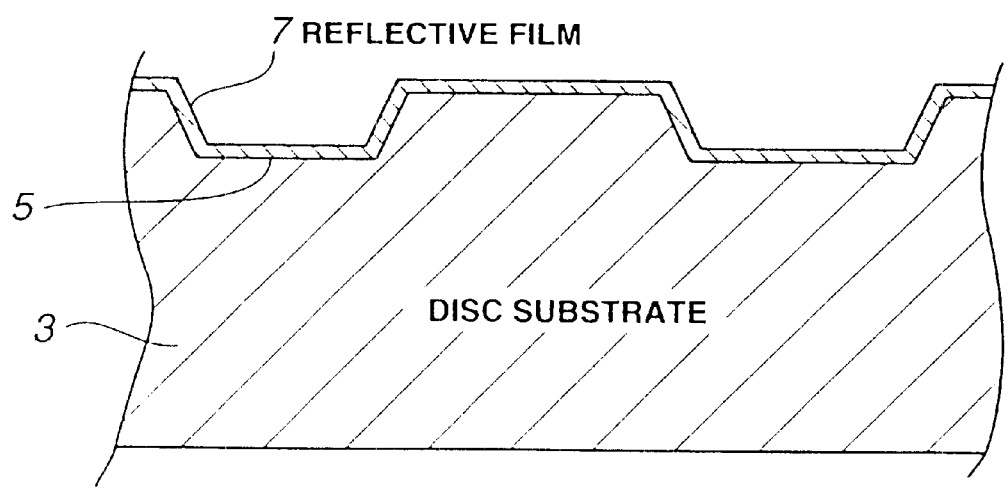
FIG. 2 is a partially cross sectional view of the disc substrate and a reflective film for explaining the first preferred embodiment of the optical disc manufacturing method (a second step) according to the present invention.

At the second step, as shown in the cross section of FIG. 2, gold (Au) is thinly deposited on a pit formed surface of the disc substrate 3 to form a transparent reflective film thereon.

Figure 3:
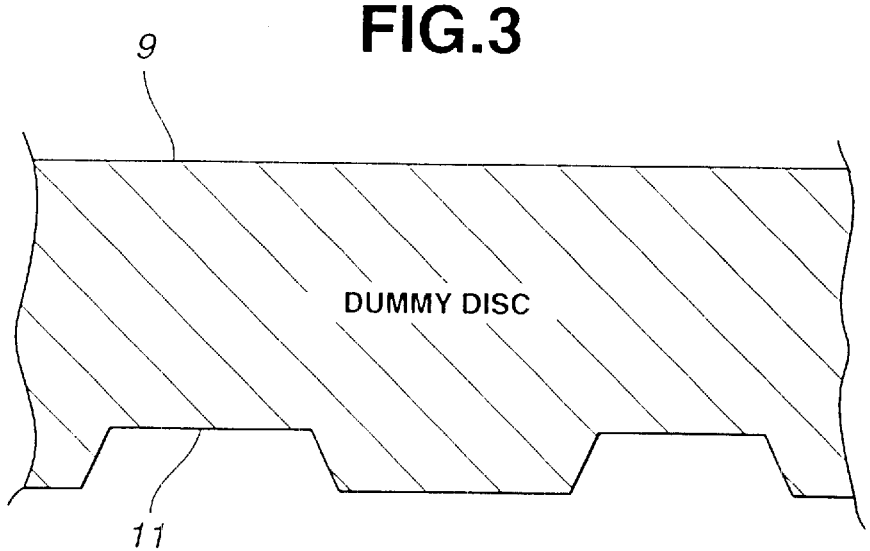
FIG. 3 is a partially cross sectional view of the dummy disc and a reflective film for explaining the first preferred embodiment of the optical disc manufacturing method (a third step) according to the present invention.

Next, as shown in the cross section of FIG. 3, a dummy disc 9 is prepared made of a material such as polymethyl methacrylate resin.

A pit 11 (a pit formed surface) which is a recess in a miniature spiral or concentric circular shape and on which an information is written is formed on one of two surfaces of the dummy disc 9, as shown in FIG. 3.

Figure 4:
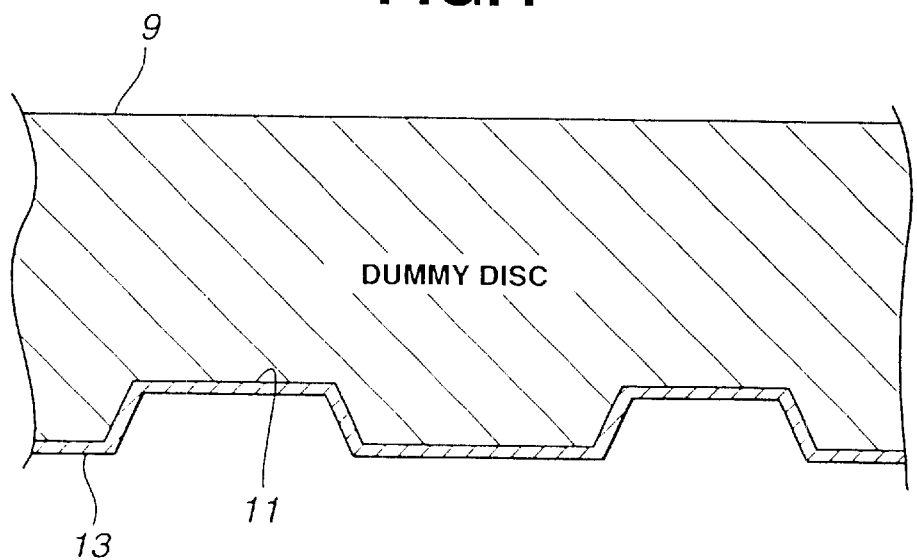
FIG. 4 is a partially cross sectional view of the dummy disc and the reflective film for explaining the first preferred embodiment of the optical disc manufacturing method (a fourth step) according to the present invention.

At the fourth step, as shown in the cross section of FIG. 4, aluminum (Al) is deposited on the pit formed surface 11 of the dummy disc 9 to form a reflective film 13. The dummy disc 9 in the first embodiment has the similar shape, size, and thickness as the disc substrate 3.

Figure 5:
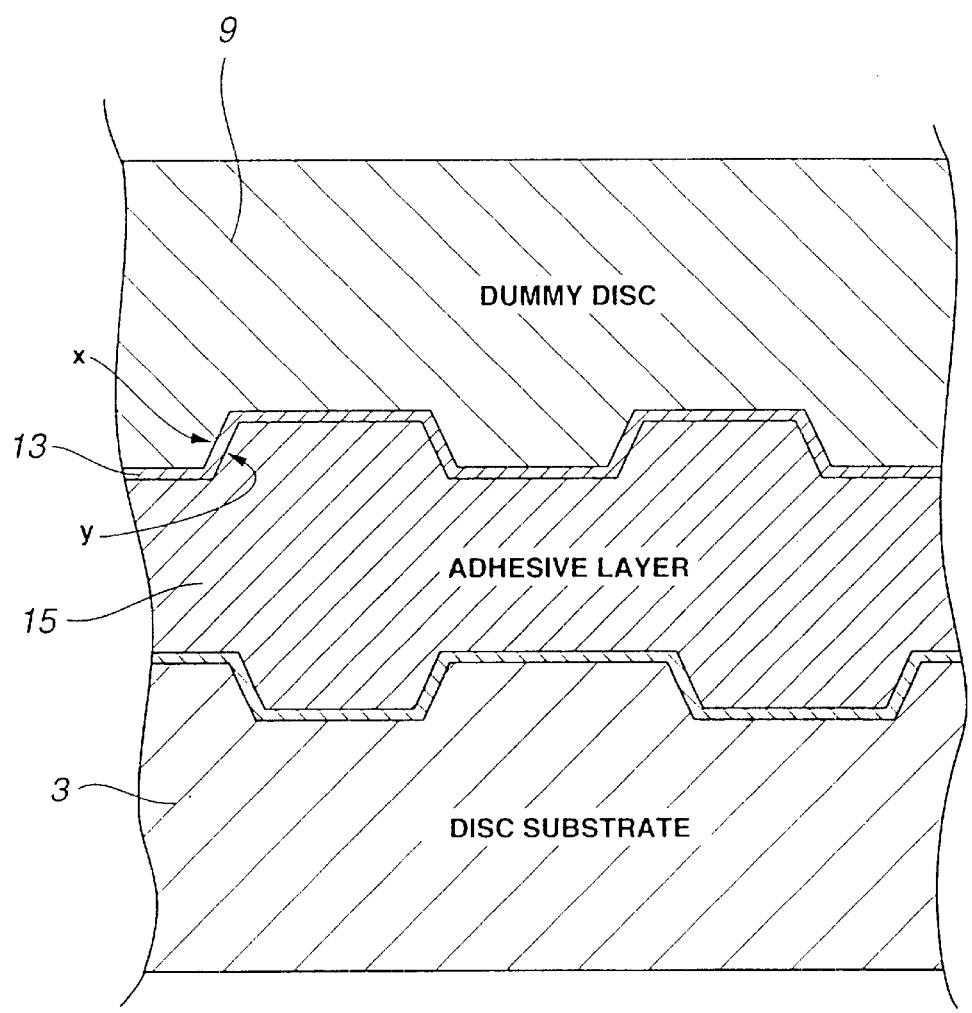
FIG. 5 is a partially cross sectional view of the dummy disc, the reflective layer, an adhesive layer, another reflective layer for explaining the first embodiment of the optical disc manufacturing method (a fifth step) according to the present invention.

At the fifth step, as shown in the cross section of FIG. 5, an adhesive layer 15 is used to bond the disc substrate on which the information record layer is formed via the second step to the dummy disc 9 on which the reflective film 13 manufactured at the fourth step is deposited. The adhesive layer 15 is made of an ultraviolet ray curing (setting) type adhesive. An ultraviolet ray is irradiated on the adhesive layer 15 after the bonding described above to harden the adhesive layer 15.

At this time, since the dummy disc 9 is made of the polymethyl methacrylate resin which is easy to be peeled off with respect to the reflective film 13, a bonding strength of the interface (x side) between the dummy disc 9 and the reflective film 13 is smaller than any other of those of the interface (y side) between the adhesive layer 15 and the reflective film 13, of an interface between the adhesive layer 15 and the reflective film 7 having such a semi-transmissive characteristic that the light is transmitted to some degree, and of an interface between the reflective film 7 and the disc substrate 3 and becomes easy to be peeled off. A single-plate disc finished at the fifth step is called a fifth-step finished product 500.

Figure 6:
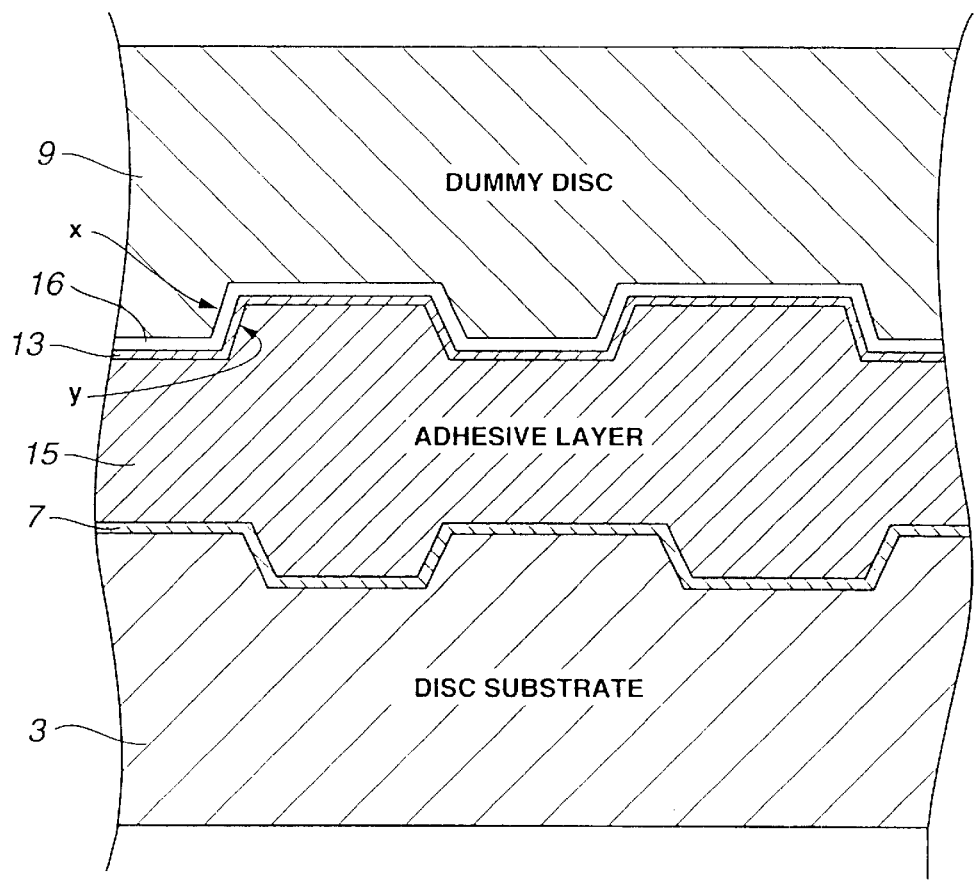
FIG. 6 is a partially cross sectional view of the dummy disc, the reflective layers, an adhesive layer, and the disc substrate for explaining the first embodiment of the optical disc manufacturing method (a sixth step) according to the present invention.

At the sixth step shown in FIG. 6, a compressed air is supplied between the disc substrate 3 and the dummy disc 9 from a center hole side (not shown in FIG. 6) of the fifth-step finished product 500 (refer to FIG. 5).

Since the peeling in the interface (x side) between the dummy disc 9 and the reflective film 13 whose bonding strength is weakest is started, an aerial layer 16 is intervened between the interface (x side) and the reflective film 13 so that the dummy disc 9 is peeled off.

During the sixth step, a first information record layer constituted by the pit row and the reflective film 7 and a second information record layer constituted by the pit row formed on the adhesive layer 15 are formed on the disc substrate 3. In other words, at a time point at which the dummy disc 9 is peeled off, the disc having both of the semi-transmissive reflective film 7 and the reflective film 13 is manufactured.

Figure 7:
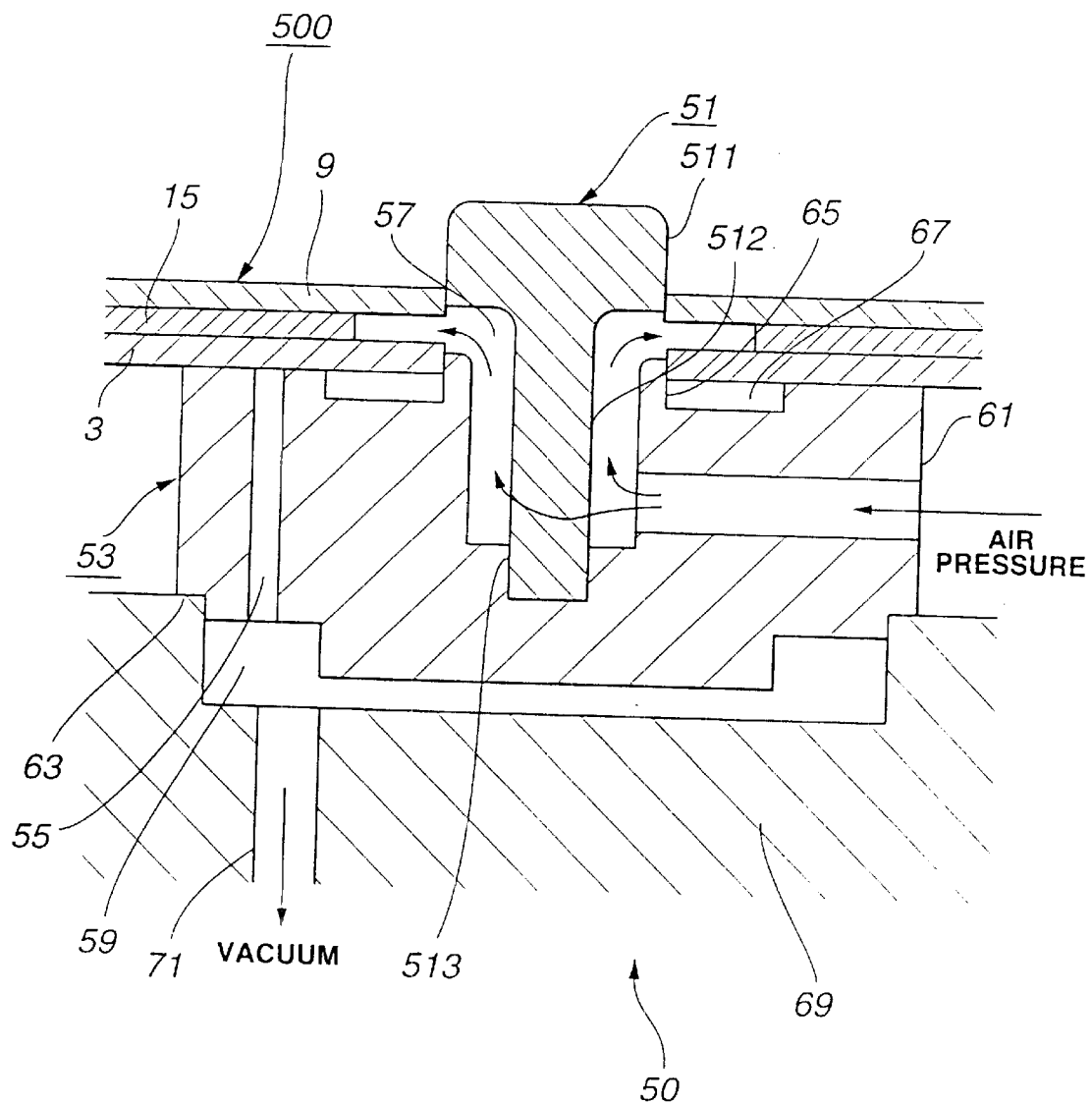
FIG. 7 is a partially cross sectional view of an example of a peeling device utilized in the optical disc manufacturing method in the first embodiment according to the present invention.

FIG. 7 shows a cross sectional view of a peeling device used at the sixth step in the first embodiment of the optical disc manufacturing method.

The peeling device 50 is generally divided into a head 53 on which the fifth-step finished product 500 is mounted and a head pin 51. The head 53 is a metallic cylindrical substance having a disc-shaped upper surface like a turn table found in a record player, a pressure applying chamber 57 formed on a center upper part of the head 53. An inlet 61 which is acted upon as a pneumatic passage (an air pressure supply passage or compressed air supply passage) to provide an air pressure from an air pressure source connected to a pressure applying chamber 57 on the center upper part thereof.

An annular rim 65 enclosing the pressure applying chamber 57 is provided on an upper surface of the head 53. A center hole of the disc substrate 3 of the fifth-step finished product 500 is inscribed on an outer periphery of the annular rim 65. An annular recess groove 67 is installed on the outer periphery of the rim 65.

A plurality of suction holes 55 at positions of 90° intervals concentrically with respect to the center hole of the disc substrate 3 are vertically penetrated through a portion of the head 53 which is further outside of the recess groove 67.

A bottom portion of the head 53 is hermetically fitted to a base block 69 with a vacuum pressure chamber 59 formed and tightened by means of bolt (not shown) at mutual fitting portion 63.

The head pin 51 is a substance in a metallic bolt-like shape in cross section and is constituted by a fixing portion 513, an axial portion 512, and a slide portion 511. The fixing portion 513 is fixed by means of a screw portion onto the bottom portion of the pressure applying chamber 57 of the head 53. The axial portion 512 is of a cylindrical shape having a diameter smaller than an inner diameter of the pressure applying chamber 58 and is extended toward a center of the pressure applying chamber 57 to support an upper slide portion 511. The slide portion 511 has a dimension such that the whole disc can be slid on the diameter of the center hole of the disc substrate 3 of the fifth-step finished product 500 and that of the center hole of the dummy disc 9 whose dimension is substantially the same as the center hole of the disc substrate 3.

Hence, since the fifth-step product 500 can be mounted on the head 53 through the head pin 51 from above the head pin 51, the slide portion 511, at this time, serves as a guide. An edge of a center hole of the dummy disc 9 is contacted on the slide portion 511. Consequently, the pressure applying chamber 57 can approximately constitute a hermetically sealed chamber.

When the dummy disc 9 is peeled off using the peeling device 50 thus constituted as described above, a vacuum state is created by means of a vacuum source (not shown) through a connecting hole 71 so that the vacuum chamber 59 connected to the connecting hole 71 is in an air pressure state lower than the atmospheric pressure. Consequently, the fifth-step finished product 500 can be attracted by means of each suction hole 55 and attracted onto the upper surface of the head 53.

Thereafter, when the air pressure of, for example, 5 kg/cm² is supplied from a compressed air source (not shown) via the inlet 61, the compressed air is supplied into the pressure applying chamber 57 via an arrow-marked route shown in FIG. 7. As appreciated from FIG. 7, since the information record layer and the adhesive layer are not formed by a predetermined dimension from center holes of the disc substrate 3 and dummy disc 9, a clearance (space) between both discs 3 and 9 is provided. The compressed air from the pressure applying chamber 57 is invaded into the clearance (space) so as to expand the clearance therebetween from the center holes. It is noted that the center holes of the disc substrate 3 and the dummy disc 9 is called an integrated center hole.

An expanding force of the compressed air causes the dummy disc 9 to be peeled off at the interface x at which the strength of adhesion (bonding strength) is weakest. The result of this peeling action is appreciated from FIG. 6.

Such an interfacial peeling as described above is started at a part of the interface placed in a vicinity of the pressure applying chamber 57 and is quickly and concentrically expanded in a radial direction toward outside of the disc 9. This peeling is carried out under the air pressure (compressed air). Hence, there is a least possibility that a damage is given onto the reflective film 13 facing the interface.

Figure 8A:
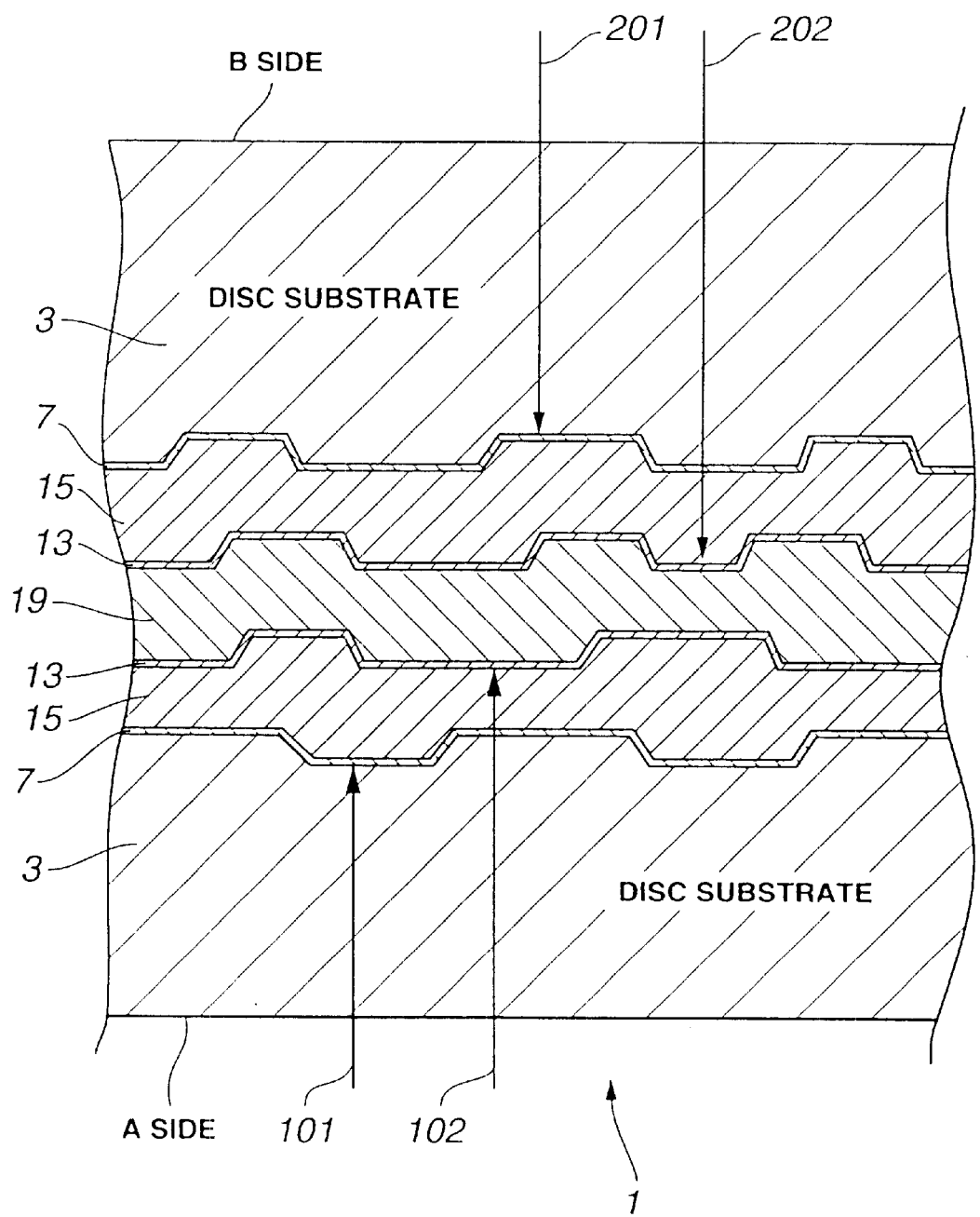
FIGS. 8A and 8B are partially cross sectional views of the optical disc finished by the first embodiment of the optical disc manufacturing method in the first embodiment.

FIG. 8A shows a cross sectional view of the DVD-18 type optical disc finished through the manufacturing method of the optical disc in the first embodiment according to the present invention described above.

The DVD-18 type optical disc 1, as shown in FIG. 8A, includes: two sheets of the single-plate discs, each of the single-plate discs being formed of a first information layer and constituted by a first pit row and the reflective film 7 on the disc substrate 3 and of a second information record layer constituting a second pit row and the reflective film 13 and one of the single-plate lines being overlapped on the other single-plate disc so that the one reflective layer 7 is faced against the other reflective layer 13 via the adhesive layer 19 and bonded thereto.

Since the two reflective films 7 and 13 are present on either surface of the optical disc, an ultraviolet ray transmissivity is, in general, low and a hot melt adhesive is, in many cases, used. However, if a film thickness of each reflective film 7 and 13 is controlled in the vicinity to a required minimum limit, it is possible to transmit the ultraviolet ray to a degree such that an ultraviolet ray curing type adhesive can be hardened. Hence, an ultraviolet ray curing type adhesive such as the adhesive layer 19 may be used. The ultraviolet ray curing type adhesive is superior to a heat resistant characteristic and durability. Consequently, the optical disc 1 thus manufactured can be applied to a usage in a vehicular mounting device (such as a car navigation system) of an automotive vehicle in which a surrounding environment is strict.

In FIG. 8A, both surfaces of A side and B side are symmetrical with the adhesive layer 19 as a center. A read-purpose laser light beam 101 incident from the A side in an arrow-marked direction is reflected on the reflective film 7 at the A side having the light semi-transmissive characteristic. A read-purpose laser light beam 102 having a different focus from the light beam 101 transmits through the reflective film 7 at the A side but is reflected on the reflective film 13 at the A side.

Similarly, a read-purpose laser light beam 201 incident from the B side is reflected on the other reflective film 7 and the read-purpose laser light beam 202 having a different focus from the light beam 201 transmits the other reflective film 7 but is reflected on the other reflective film 13.

Figure 8B:
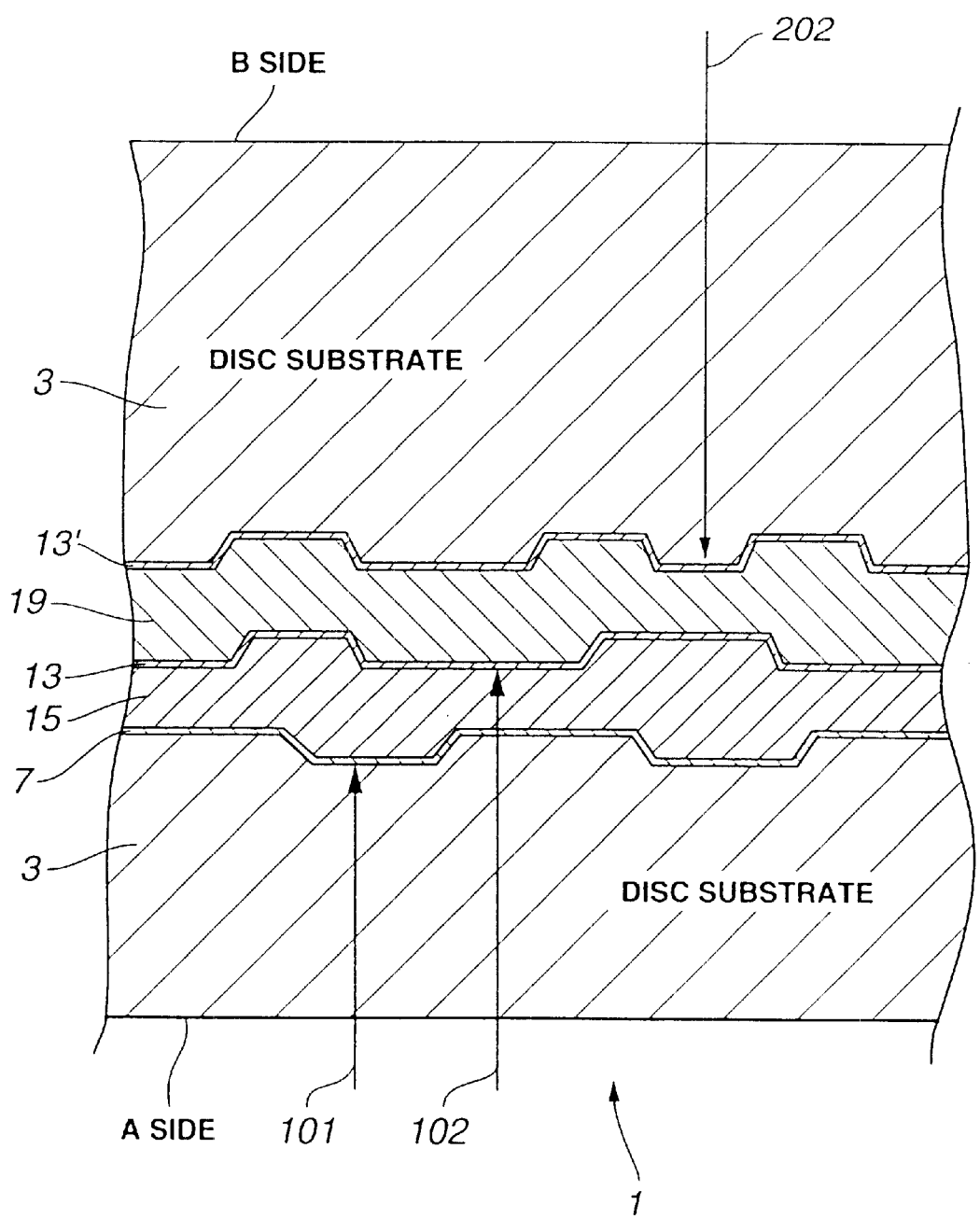

It is noted that although the DVD-18 type optical disc has been described with reference to FIG. 8A, a manufacturing method described in the first embodiment can be applied to another DVD type optical disc, called DVD-14 (refer to FIG. 8B), and including the single-plate disc formed of the first information record layer constituted by the first pit row 13 and the reflective layer 7 on the disc substrate 3 and the second information record layer constituted by the second pit row and the reflective layer 13 and the other single-plate disc formed of a single information record layer formed of the normal pit row and the reflective film 13', both of the single-plate discs being bonded together.

Specific steps of the manufacture are the same as those described in the first embodiment with reference to FIGS. 1 through 8A.

Second Embodiment

Figure 9A:
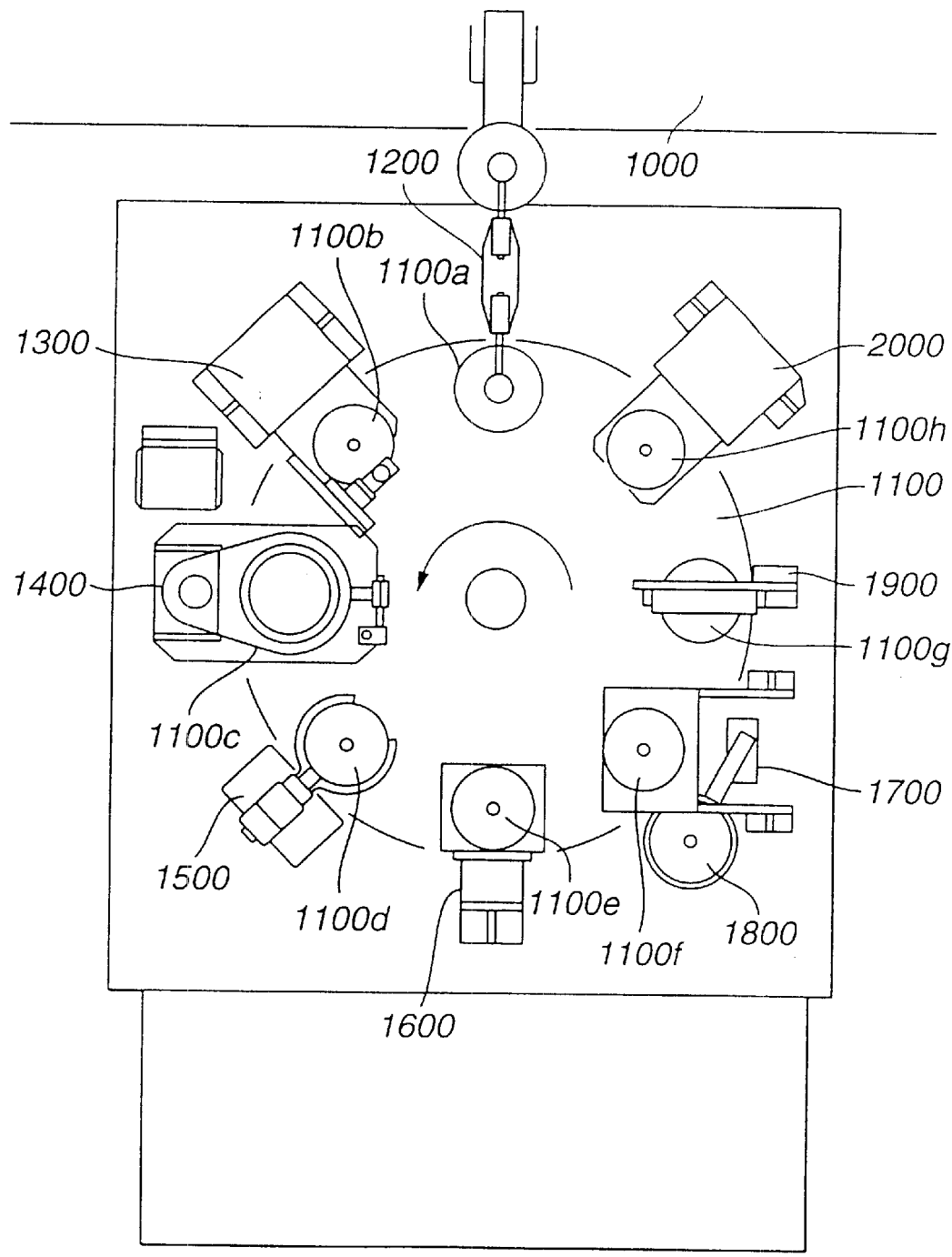
FIG. 9A is an explanatory view of a preferred embodiment of an apparatus for manufacturing the optical disc including a preliminary, partial peeling mechanism according to the present invention applicable to a second embodiment of the optical disc manufacturing method according to the present invention.

FIG. 9A shows a general configuration view of a manufacturing apparatus for an optical disc applicable to the manufacturing method in a second preferred embodiment according to the present invention.

Figure 9B:
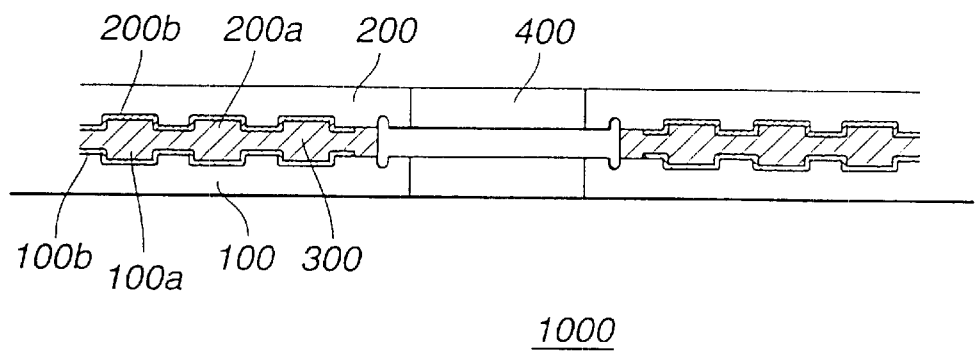
FIG. 9B is a schematic view of a bonding device shown in FIG. 9A.

It is noted that, in FIG. 9A, a reference numeral 1000 denotes a bonding device on which the disc substrate 100 and the dummy disc 200 are bonded together via the adhesive layer 300. It is also noted that since the bonding device 1000 is well known so that the detailed description thereof is omitted herein. FIG. 9B shows the bonding device 1000 briefly. In the bonding device 1000, the fifth-step finished product 500 described above with reference to FIG. 5 is made. In FIG. 9B, a reference numeral 400 denotes the integrated center hole of the disc substrate 100 (corresponds to the reference numeral 3 in the first embodiment) and the dummy disc 200 (corresponds to the reference numeral 9), 200a denotes the pit (corresponds to 11 (information record layer)), 200b denotes the (second) reflective film (corresponds to 13), 300 denotes the adhesive layer (corresponds to 15), 100a denotes the information record layer such as the pit at the dummy disc side (corresponds to 5), and 100b denotes the (first) reflective film of the disc substrate (corresponds to 7).

In FIG. 9A, a reference numeral 1100 denotes a turn table having a plurality of functional portions as will be described below, a reference numeral 1200 denotes a disc carrying mechanism used to transmit the bonded disc substrate and the dummy disc from the bonding device 1000 to a disc receipt position 1100a of the turn table 1100.

In addition, in FIG. 9A, a reference numeral 1300 denotes an adhesive removing mechanism used to remove a part of the adhesive protruded from the space between the disc substrate 100 and the dummy disc 200 when the optical disc being manufactured is transferred from the receipt position 1100a to the adhesive removing position 1100b and a reference numeral 1400 denotes an electrostatic charge-eliminating-and-cleaning mechanism used to remove a dust adhered on the disc at a cleaning position 1100C. Furthermore, in FIG. 9A, a reference numeral 1500 denotes a reverse mechanism used to reverse a position of the disc substrate from a front position to a rear position with a position of the dummy disc reversed from the rear position to the front position since the disc is carried on the turn table from the disc receipt position 1100a to the reverse position 1100d in order to prevent the disc from being damaged.

Next, in FIG. 9A, a reference numeral 1600 denotes a mechanical preliminary, partial peeling mechanism used to apply a mechanical force between the disc substrate 100 and dummy disc 200 at a preliminary, partial peeling position 1100e to partially peel off the dummy disc 200. A reference numeral 1700 denotes an air pressure peeling mechanism used to expel the completely peeled dummy disc from a peeling position 1100f to a recycle box 1800, with the compressed air supplied into the space between the partially peeled disc substrate and dummy disc by means of a mechanical preliminary, partial peeling mechanism 1600. A reference numeral 1900 denotes another electrostatic charge-eliminating-and-cleaning mechanism used to eliminate electric charges and dusts on the disc at an electrostatic eliminating position 1100g. A reference numeral 2000 denotes an adhesive disposed mechanism used to remove the part of the adhesive layer bonded on the inner peripheral and outer peripheral portions of the disc substrate and to complete the disc as the DVD when the two sheets of the disc substrates are bonded together.

FIGS. 10 through 14 show specific structure of the mechanical preliminary, partial peeling mechanism 1600 and a step of peeling off the disc substrate 100 and the dummy disc 200 using the mechanical preliminary, partial peeling mechanism 1600.

Figure 10:
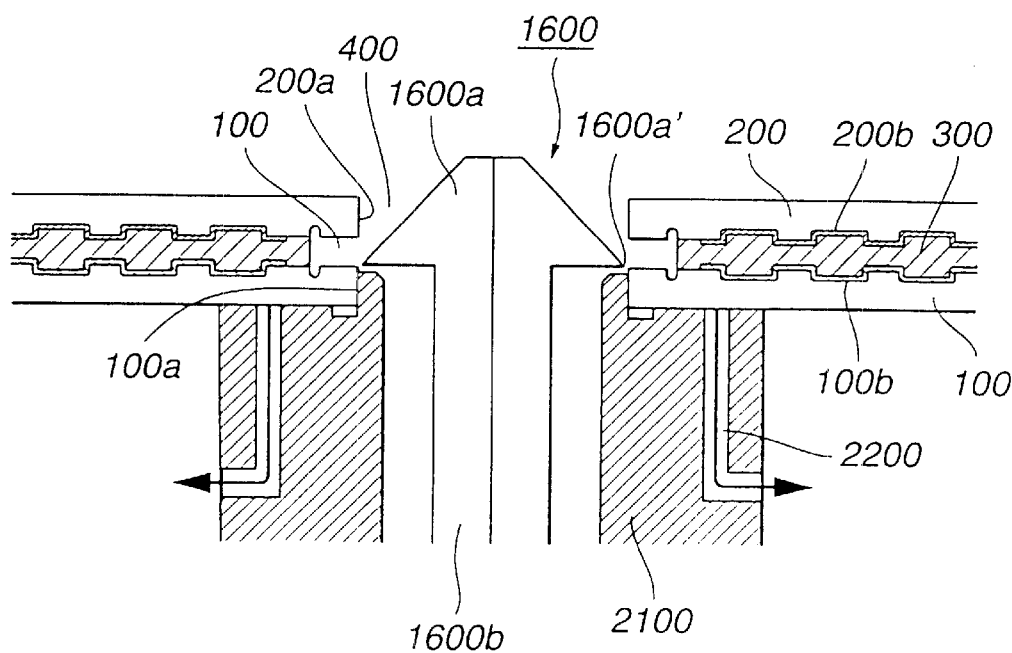
FIG. 10 is a partially cross sectional view (a diameter constricted state) for explaining the preliminary, partial peeling mechanism in the optical disc manufacturing apparatus applicable to the second embodiment of the optical disc manufacturing method according to the present invention.
Figure 11:
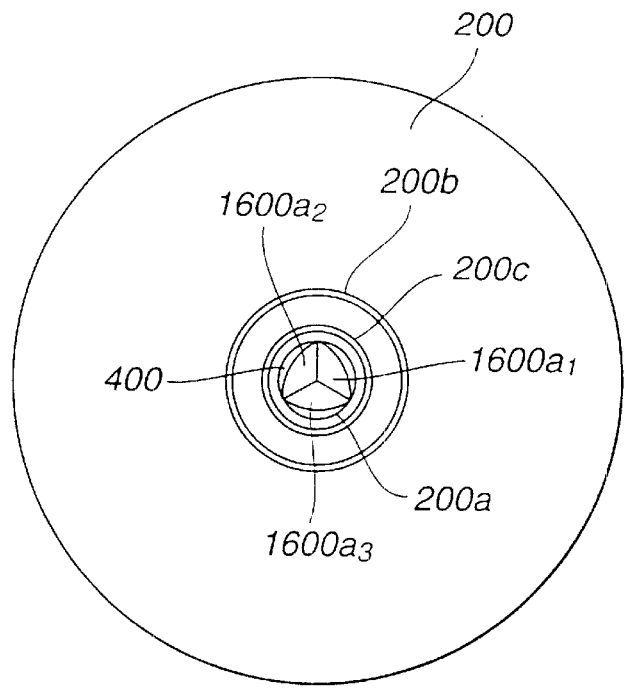
FIG. 11 is a top view of the optical disc for explaining an operation of the preliminary, partial peeling mechanism (a diameter expanded state) in the optical disc manufacturing apparatus shown in FIG. 10.
Figure 12:
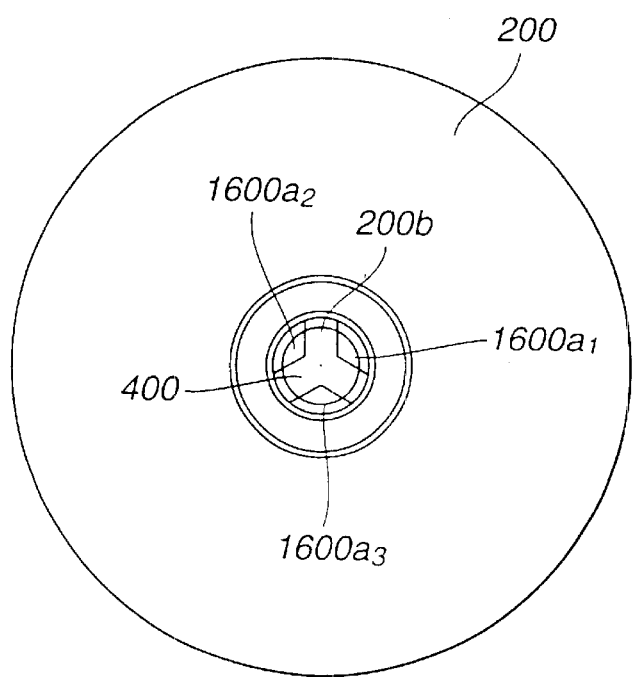
FIG. 12 is a top view of the optical disc for explaining the operation of the preliminary, partial peeling mechanism (the diameter expanded state) in the optical disc manufacturing apparatus applicable to the second embodiment of the optical disc manufacturing method according to the present invention.
Figure 13:
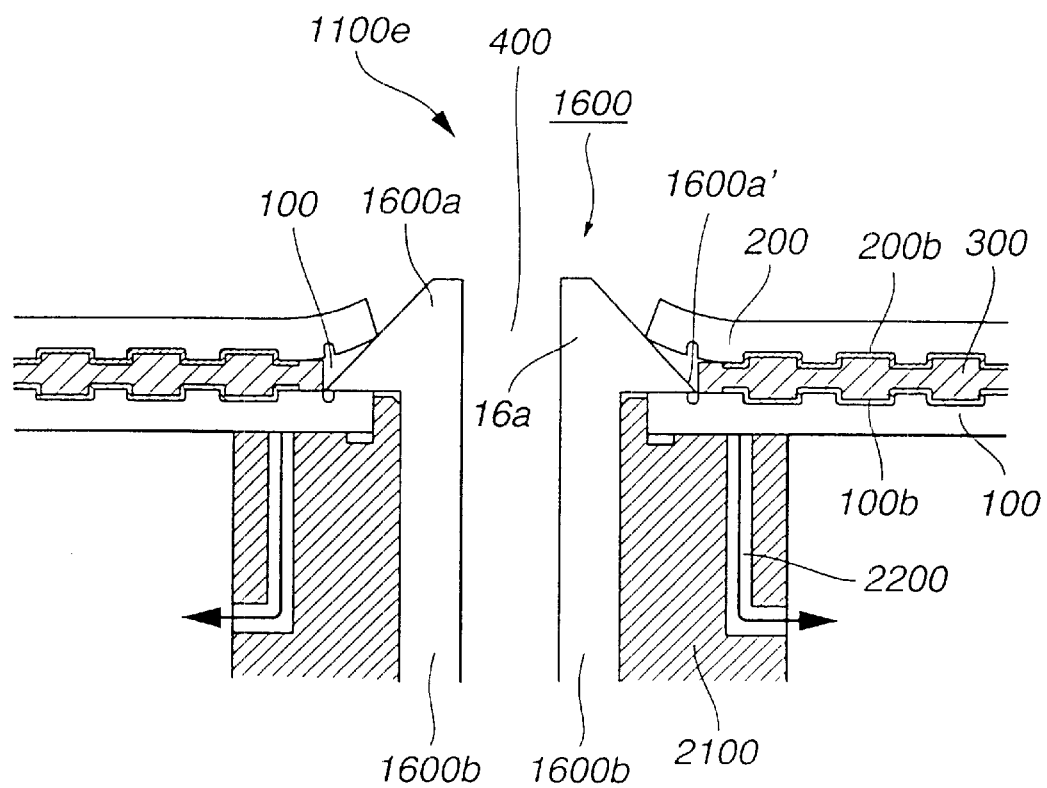
FIG. 13 is a partially expanded cross sectional view of the preliminary, partial peeling mechanism (the diameter expanded state) in the optical disc manufacturing apparatus according to the present invention for explaining the operation of the preliminary, partial peeling mechanism.
Figure 14:
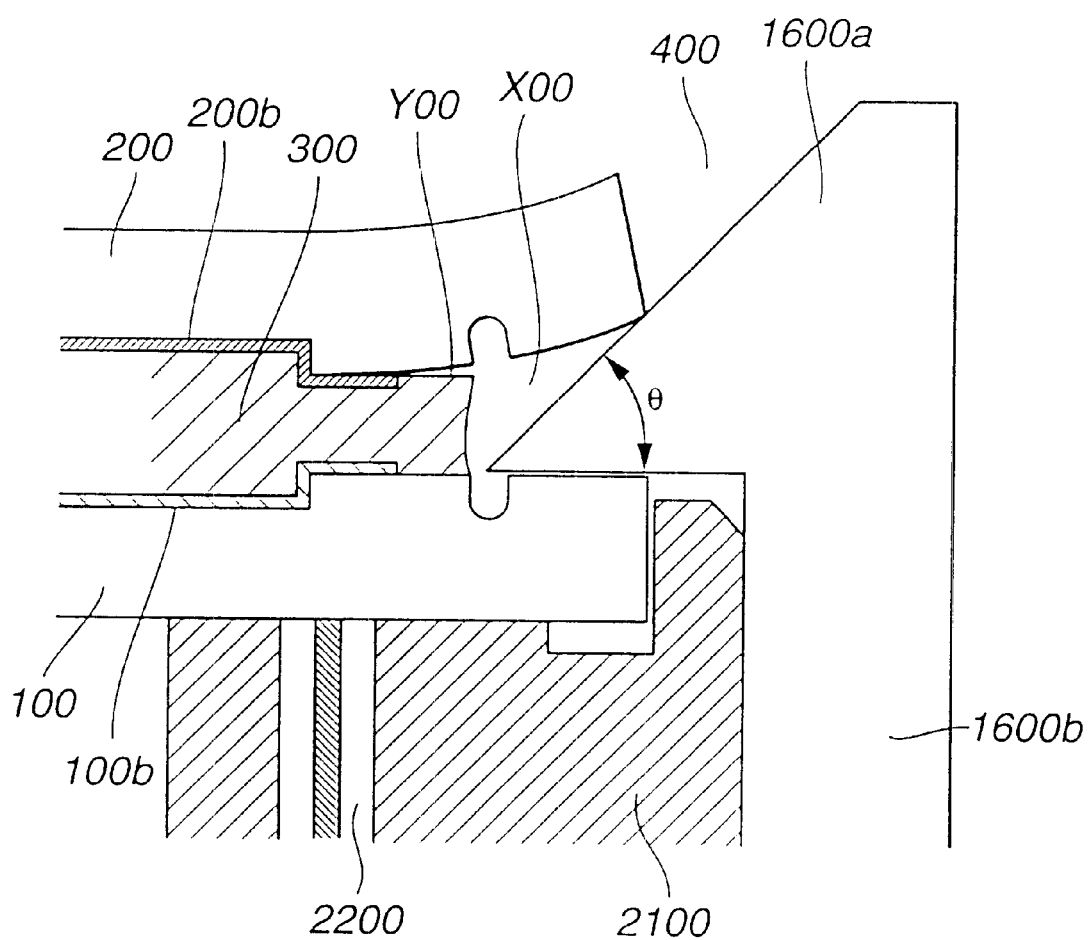
FIG. 14 is a partially expanded cross sectional view of a part of the preliminary, partial peeling mechanism (the diameter expanded state) in the optical disc manufacturing apparatus applicable to the second embodiment of the optical disc manufacturing method according to the present invention for explaining the operation of the preliminary, partial peeling mechanism.

Since mutually divided three wedge portions 1600a1, 1600a2, and 1600a3 shown in FIGS. 10, 11, and 12 have the mutually same structures and perform mutually equal operations, the three wedge portions are explained as a representative wedge portion 1600a with reference to FIGS. 10, 13, and 14.

FIG. 10 shows a state of the preliminary, partial peeling position 1100e.

When the turn table 1100 is stopped at the preliminary peeling position 1100e, a disc cradle 2100 and the mechanical preliminary, partial peeling mechanism 1600 are raised via an opening (not shown) of the turn table 1100. The bonded disc substrate and the dummy disc on the turn table are supported on the disc cradle 2100. In this state, the wedge portion 1600a which is a head portion of the mechanical preliminary, partial peeling mechanism 1600 is located within the integrated center hole 400 of the disc substrate 100 and the dummy disc 200. A level of a tip 1600a' of the wedge portion 1600a of the mechanical preliminary, partial peeling mechanism 1600 is set so as to fall in a range of the clearance (space) between the disc substrate 100 and the dummy disc 200.

An essential part of the mechanical preliminary, partial peeling mechanism 1600 is constituted by the three (common diameter) expandable and constrictive wedge portions 1600a1, 1600a2, and 1600a3 having the same structure as those shown in FIGS. 11 and 12. These wedge portions 1600a1, 1600a2, and 1600a3 have plane figures which give approximately arc shapes extended respectively through 120 degrees. The respective wedge portions 1600a1, 1600a2, and 1600a3 are integrally constructed on respectively corresponding support portions 1600b.

The three support portions 1600b are connected to a known drive mechanism (not shown in this embodiment) so as to be enabled to perform diameter expansion and constriction operations of the wedge portions 1600a and the upward and downward operations thereof.

In addition, when these three wedge portions 1600a1, 1600a2, and 1600a3 are under diameter-constriction state, in other words, are mutually contacted state, a maximum diameter of these wedge portions 1600a is set so as to be smaller than the diameter of the integrated center hole 400 of the disc substrate 100 and the dummy disc 200 and the inner diameter of the opening of the disc cradle 2100.

Suppose that, as shown in FIG. 14, an angle θ of the three wedge portions 1600a with respect to the disc substrate 100 is, for example, 30 degrees and, preferably, is in a range from 25 degrees to 45 degrees with a diameter of the integrated center hole 400 of the disc substrate 100 and the dummy disc 200 taken into consideration.

It is not necessary to limit a wedge-like shape of the wedge portion 1600a onto the shape of the wedge portion 1600a shown in FIGS. 10 and 11, another wedge-like shape having substantially symmetrical in the upward and downward directions may be applied.

When the turn table 1100 is stopped at the preliminary, partial peeling position 1100e, the diameter-constricted three wedge portions 1600a are raised via the turn table 1100 and the opening of the disc cradle 2100 so that a tip 1600a' of each wedge position 1600a is not constructed with inner peripheral surfaces 100a and 200a of the corresponding disc substrate 100 and the dummy disc 200 but is stopped at a level at which the tip 1600a' of the wedge portion 1600a is located at the clearance X00 provided between the bonded disc substrate 100 and the dummy disc 200. In this state, since the suction of the compressed air is carried out through a suction passage 2200 installed on the disc cradle 2100, the disc substrate 100 can be attracted onto the disc cradle 2100 and the disc substrate 100 is stably positioned.

Next, the drive mechanism (not shown) is used to operate the three wedge portions 1600a in the common diameter expanding direction, namely, in the radial outward direction, as shown in FIGS. 12 and 13. The tip 1600a' of each wedge portion 1600a is inserted into the clearance X00 between the disc substrate 100 and the dummy disc 200 to give a widely opening force thereto. Consequently, as shown in FIG. 14 which is an expanded view of a left side of FIG. 13, a break of peeling Y00 occurs on an inner peripheral portion on the (first) interface between the dummy disc 200 and the reflective film 200b whose bonding strength is smaller than any one of those of an interface between the disc substrate 100 and its reflective film 100b, of an interface between the disc substrate 100 and the adhesive layer 300, and of an interface between the adhesive layer 300 and the reflective film 200b.

It is noted that each arc-shaped outer periphery of the three wedge portions 1600a in the diameter expanded state is present on the substantially same circumference which is virtual. Thus, the three wedge portions 1600 can give a substantially equal force on the clearance X00 between the disc substrate 100 and the dummy disc 200 along their outer peripheries. External forces are not concentrated only on some parts of the disc substrate 100 nor strengthened only on these parts. Hence, no ill influence on the disc substrate 100 is given and the subsequent perfect peeling between the disc substrate 100 and the dummy disc 200 can be facilitated as will be described later.

Figure 15:
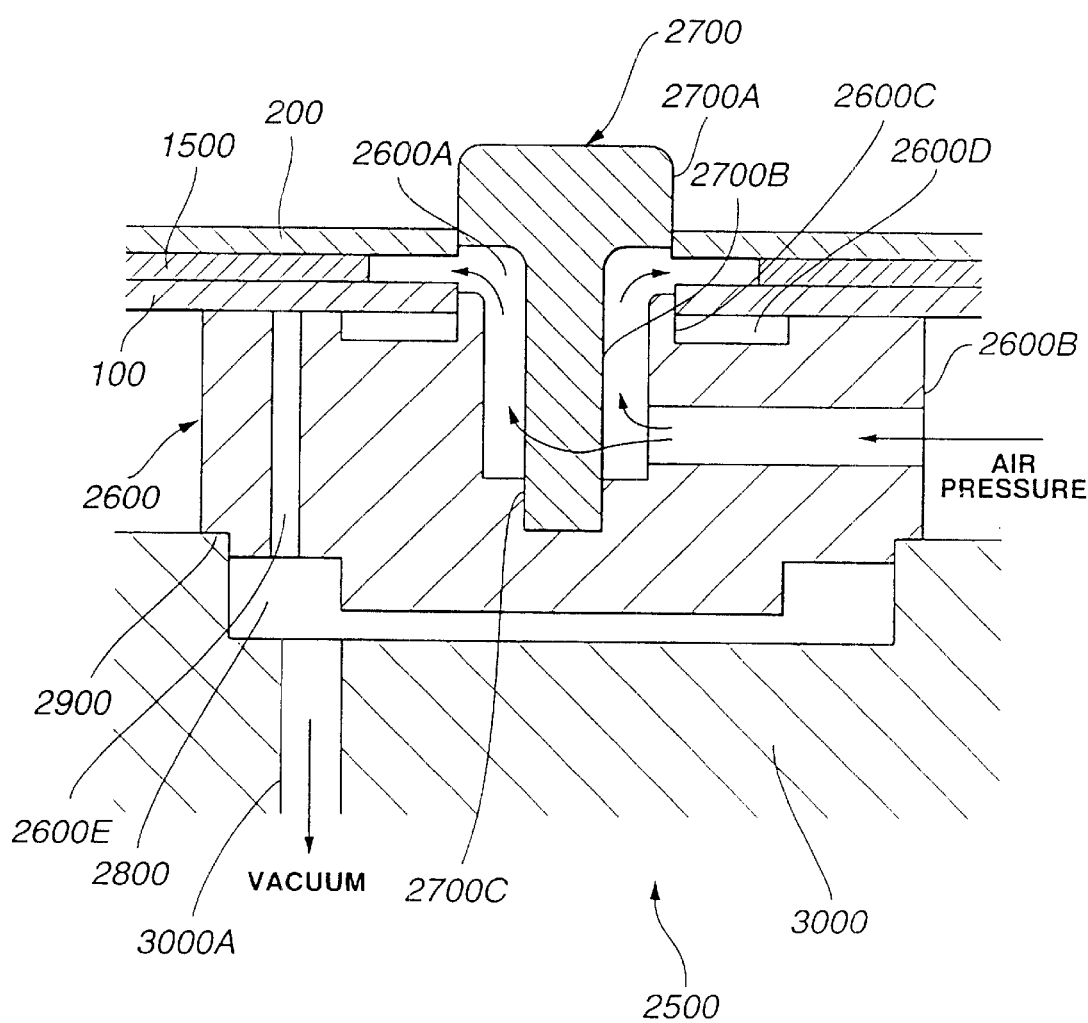
FIG. 15 is a partially cross sectional view of the example of the peeling device applicable to the optical disc manufacturing method in the second preferred embodiment according to the present invention.

Next, the preliminarily partial peeled disc substrate 100 and the dummy disc 200 are perfectly and completely peeled off at the interface between the dummy disc 200 and the second reflective film 200b by means of the peeling device 2500 shown in FIG. 15.

The peeling device 2500 is generally constituted by the head 2600 on which the disc substrate 100 and the dummy disc 200 are mounted and by the head pin 2400.

The head 2600 is made of the cylindrically shaped metallic substance having the upper surface in a disc shape like the turn table in the record playing apparatus as described with reference to FIG. 7. At the pressure applying chamber 2600A is installed on a center upper part of the head 2600. The inlet 2600B which acts as the air pressure passage to provide the air pressure for the pressure applying chamber 2600A is connected to the pressure applying chamber 2600A. The annular rim 2600C enclosing the pressure applying chamber 2600A is present on the upper surface of the head 2600. The center hole 400 of the disc substrate 100 is inscribed on an outer circumference of the rim 2600C. The annular recess groove 2600D is disposed on the outer periphery of the rim 2600C. The plurality of suction holes 2600E are vertically penetrated at the disc portion further outside of the recess groove 2600D at respective 45° intervals in the concentric form with respect to the integrated center hole. A bottom portion of the head 2600 is formed of the vacuum chamber 2800. The vacuum chamber 2800 is formed on the bottom portion of the head 2600. The mutual fitting portion 2900 is tightened by means of the bolt (not shown) to be hermetically fitted to the base block 3000.

The head pin 2700 is made of the metallic bolt-like shape body. The head pin 2700 includes: the head portion 2700A whose diameter is slightly shorter than the diameter of the center hole 400 between the disc substrate 100 and the dummy disc 200; the axle portion 2700B axially supporting the head portion 2700A; and the fixing portion 2700C fixing the axle portion 2700B by means of the screw portion (not shown) onto the bottom portion of the pressure applying chamber 2600A of the head 2600. The axle portion 2700B is of the cylindrical shape having the diameter shorter than the diameter of the integrated center hole 400 penetrated between the disc substrate 100 and the dummy disc 200 and forms the pressure applying chamber 2600A against the vertical inner wall of the head 2600.

In addition, the head portion 2700A has such the dimension as to be enabled to be slid on an inner peripheral wall of the integrated center hole 400 between the disc substrate 100 and the dummy disc 200. Hence, the head portion 2700A can be rested on the upper portion of the head 2600 from an upper surface of the head pin 2700 via the integrated center hole 400 between the disc substrate 100 and the dummy disc 200. At this time, the head portion 2700A serves as a guide and an edge of the center hole of the dummy disc is contacted against the head portion 2700A. Hence, the pressure applying chamber 2600A generally constitutes the air tightened chamber (the hermetically sealed chamber).

Thereafter, when the air pressure of, for example, 5 kg/M² is supplied to the inlet 2600B from the compressed air source (not shown), the compressed air is supplied into the pressure applying chamber 2600A via the routes denoted by arrow marks shown in FIG. 15.

As shown by FIG. 15, since the information record layer and the adhesive layer are not formed by the predetermined dimension from the center hole 400 between the disc substrate 100 and the dummy disc 200, the space is present between both discs and the compressed air from the pressure applying chamber 2600A enters its space (clearance) between both discs to act to expand the space between the disc substrate 100 and the dummy disc 200 from the integrated center hole (400).

Since the clearance Y00 about the integrated center hole 400 between the disc substrate 100 and the dummy disc 200 is already peeled off partially at an inner peripheral portion on an interface between the dummy disc 200 itself and the reflective film 200b, the expanding force exerted by the compressed air causes the dummy disc 200 to be easily peeled off from the reflective film 200b.

Such the interfacial peeling as described above is started from the peeled interface placed in the vicinity to the interface on which the pressure applying chamber 2600A is contacted and is quickly and mechanically expanded in the radial direction toward the outside of the dummy disc 200. This peeling is carried out under the air pressure. Hence, there is a least possibility that the damage is given to the reflective film 200b contacted on the interface.

Thereafter, the drive mechanism (not shown) is driven to lower the base block 3000 and the head 2600 and, during the lowering process, both of the disc substrate 100 and the dummy disc 200 are mounted on the turn table 1100. Then, the completely peeled dummy disc 200 is expelled into the recycle box 1800 and the disc substrate 100 having the reflective film 100b and the reflective film 200b left on the surface of the adhesive layer 300 is, then, left on the turn table 1100. The disc substrate 100 on the turn table 1100 is then fed to the next electrostatic-preventive-and-cleaning position 1100g.

The DVD-18 type optical disc can be manufactured by bonding two sheets of the disc substrates 100 thus formed with the adhesive so that both reflective films 200b and 200b thereof are faced against each other (not shown).

Third Embodiment

Figure 16:
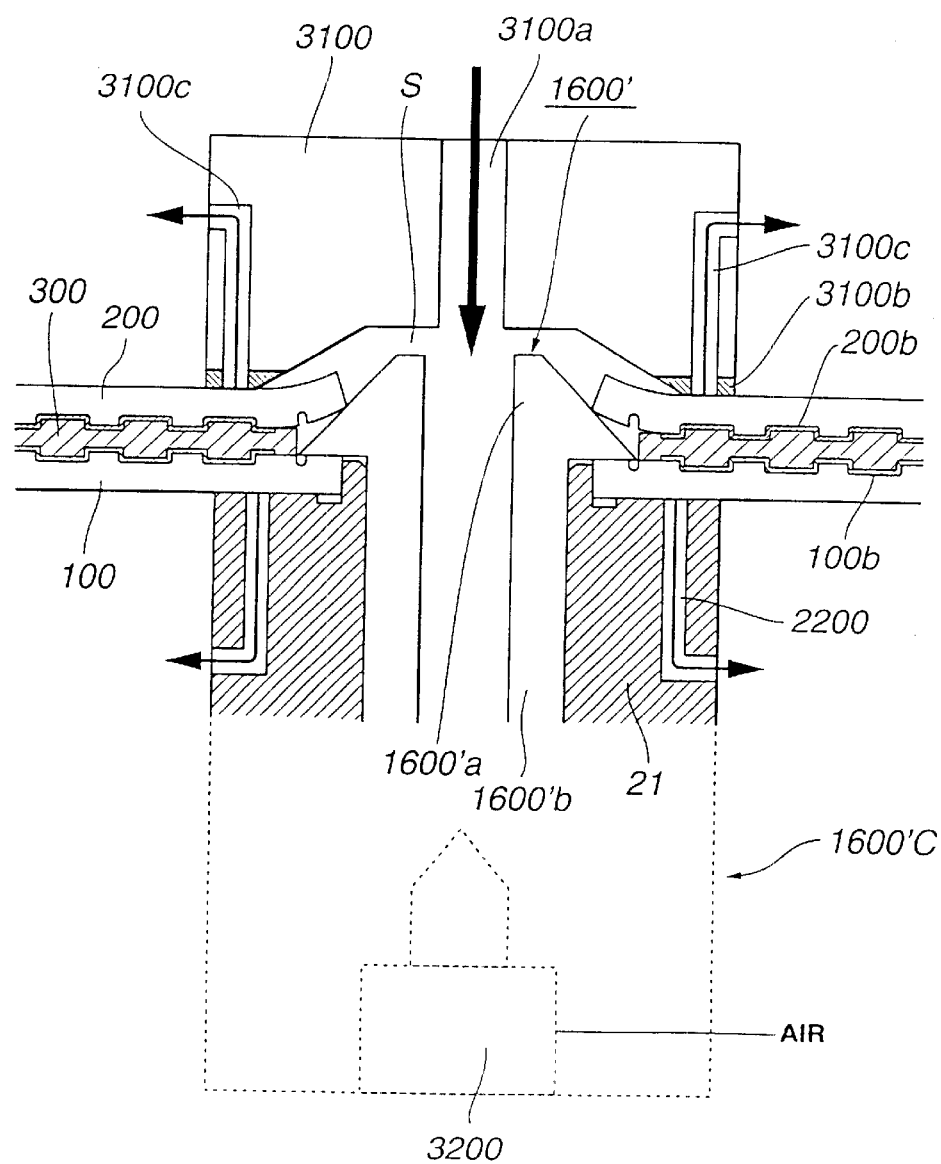
FIG. 16 is a partially cross sectional view of a second preferred embodiment of the peeling mechanism applicable to a third preferred embodiment of the optical disc manufacturing method.

Next, FIG. 16 shows another peeling device applicable to a third preferred embodiment of the manufacturing method for the optical disc according to the present invention.

In the third embodiment of the manufacturing method, the mechanical peeling and fluid-assisted (air pressure) peeling in the above-described second embodiment are carried out integrally at the same position. That is to say, with the integrated center opening periphery between the disc substrate 100 and the dummy disc 200 expanded through the partial peeling carried out using the mechanical force, the compressed air is (supplied) to the space provided by expanding between the disc substrate 100 and the dummy disc 200 to completely peel off the dummy disc 200 from the reflective film 200b.

As shown in FIG. 16, in addition to the mechanical partial peeling mechanism 1600' whose structure and operation is described in the second embodiment of the manufacturing method with reference to FIGS. 13 and 14, a blow head 3100 is disposed which can selectively hold the mechanical partial peeling mechanism 1600' within a further space S.

The blow head 3100 includes: a compressed air supply passage 3100a connected with a compressed air supply source (not shown); a suction pad 3100b; an suction passage 3100c used to attract the dummy disc 200 onto the suction pad 3100b; and the mechanical partial peeling mechanism 1600'. A trapezoidal shaped recess is provided to form the further space S enabled to perform the diameter expanding-and-constricting operation. The compressed air supply passage 3100a is linked to a nozzle (not shown).

This nozzle is provided with small-diameter nozzle tips whose nozzle portions are faced in three directions so as to be entered into three clearances between the three respective wedge portions 1600'a when the three wedge portions 1600'a in the mechanical partial peeling mechanism 1600' are under their diameter expanded state as shown by FIG. 12.

The nozzle tip portions faced in the three directions at equal intervals are positioned so that the air is directly supplied into the space between the disc substrate 100 and the dummy disc 200.

The blow head 3100 is linked to its drive mechanism (not shown) so as to be lifted in upward direction or downward direction via such an elasticity device as a spring coil or pneumatic cylinder (not shown).

As described above, since the three wedge portions 1600'a and its brace (support) portions 1600'b in the mechanical partial peeling mechanism 1600' carrying out the diameter expanding operation to widen the common diameter of the tips of the wedge portion within the center opening of the disc cradle 2100, it is necessary not to leak the compressed air from a lower end of the disc cradle 2100.

Hence, in this embodiment, a drive mechanism 3200 such as the pneumatic cylinder used to drive the mechanical partial peeling mechanism 1600' to operate the three wedge portions 1600'a to widen the tips of the three wedge portions 1600'a to expand their diameters is housed, as denoted by a dot line of FIG. 16, within an internal of the lower portion 1600'c of the closed disc cradle 2100. The disc cradle 2100 has an open structure at its upper surface. An air supply tube to drive the drive mechanism 3200 is externally led out via a gasket (packing, not shown) disposed on a side wall of the lower portion 1600'c of the mechanical partial peeling mechanism 1600'.

Next, the peeling operation carried out using the third embodiment of the optical manufacturing method will be described below.

As described before, the drive mechanism 3200 is driven to operate the mechanical partial peeling mechanism 1600' so that the common diameter of the three wedge portions 1600'a is expanded. Then, the tips of the three wedge portions 1600'a are interrupted into the space between the disc substrate 100 and the dummy disc 200 to partially peel off the inside between the disc substrate 100 and the dummy disc 200 (at the interface between the dummy disc 200 and the second reflective film 200b as described above). On the other hand, after the mechanical partial peeling mechanism 1600' is operated to widen the common diameter of the wedge portions 1600'a, the blow head 3100 is contacted with the upper surface of the dummy disc 200. Thus, the nozzle (not shown) and its nozzle tip portion are inserted into the widened space between the respective wedge portions 1600'a. Under this condition, the air suction is carried out from the suction passage 3100c for the suction pad 3100b to attract the dummy disc 200 onto the suction pad 3100b.

Next, the compressed air is supplied through the compressed air supply passage 3100a so that the compressed air is blown into the space between the disc substrate 100 and the dummy disc 200 from the nozzle tip portion.

The compressing force that the blow head 3100 gives to the dummy disc 200 is smaller (weaker) than the pressure of the compressed air. Hence, the elasticity (the elastic force) of the elasticity device is thus set.

The compressed air is invaded into the peeled space between the disc substrate 100 and the dummy disc 200 due to the diameter expanded operation of the plurality of wedge portions 1600'a of the mechanical peeling mechanism 1600' so that the dummy disc 200 is peeled off from its reflective film 200b and both of the blow head 3100 and the attracted dummy disc 200 are raised in the upward direction.

Thereafter, the blow head 3100 is raised with the dummy disc 200 attracted and held thereon to dispose the dummy disc 200 (on, for example, the recycle box).

At this time, the mechanical force caused by the rise in the blow head 3100 may not be applied to the peeling operation such as to completely nor partially peel off the dummy disc 200 from its reflective film 200b.

It is noted that, in this embodiment, in a case where the blow head 3100 is not connected to the drive mechanism (not shown) via the elasticity device such as the spring or the cylinder (not shown) but is directly connected to the drive mechanism, the compressed air is supplied to the compressed air supply passage 3100a with the blow head 3100 contacted on the upper surface of the dummy disc 200 and, thereafter, a weak force such as to raise the blow head 3100 is given so that the compressed air along with the peeling of the dummy disc 200 is passed through the space provided between the dummy disc 200 and its reflective film 200b.

In addition, although, in the each embodiment of the manufacturing method, the number of the wedge portions 1600'a (1600a) are three, the numbers of the wedge portions may be four or more.

Furthermore, the nozzle is not always necessary. It is possible to peel off the dummy disc 200 by appropriately increasing the pressure of the further space S using the compressed air without such a nozzle as described above.

The entire contents of Japanese Patent Applications No. Heisei 11-26274 (filed on Feb. 3, 1999), Heisei 11-150960 (filed on May 31, 1999), Heisei 11-327828 (filed on Nov. 18, 1999) are herein incorporated by reference. Although the invention has been described above by reference to certain embodiments of the invention, the invention is not limited to the embodiments described above. Modifications and variations of the embodiments described above will occur to those skilled in the art in the light of the above teachings. The scope of the invention is defined with reference to the following claims.

What is claimed is:

1. An apparatus for manufacturing an optical disc comprising:
 a bonding device to bond a transparent disc substrate having two surfaces thereof on at least one of which a first information is recorded and a first reflective film is formed onto a dummy disc having similar surfaces thereof on at least one of which a second information is recorded and a second reflective film is formed via an adhesive layer, and
 an external force applying device including
  a preliminary, partial peeling mechanism that is enabled to expand between the dummy disc and the disc substrate through an integrated center hole of the dummy disc to partially peel off the dummy disc from the second reflective film, and
  a peeling mechanism that supplies a compressed air to a space provided between the partially peeled dummy disc and the disc substrate to completely peel off the dummy disc from the second reflective film.

2. An apparatus for manufacturing an optical disc as claimed in claim 1, wherein the peeling mechanism includes:
 a compressed air supplying passage through which a compressed air having an air passage through which a compressed air having an air pressure higher than the atmospheric pressure is supplied to a space between the bonded disc substrate and the dummy disc; and
 a pressure supplying chamber formed on the integrated center hole penetrated through the bonded disc substrate and the dummy disc and a space provided between the disc substrate and the dummy disc and linked to the compressed air supply passage.

3. An apparatus for manufacturing an optical disc as claimed in claim 1, wherein the external force applying device includes: a disc cradle that receives the bonded disc substrate and dummy disc carried from the bonding device and to attract the disc substrate side onto its cradle portion; a mechanical peeling device that expands between the dummy disc and disc substrate on the disc cradle through the integrated center hole to partially peel off the dummy disc from the second reflective film; and an air pressure peeling device that supplies a compressed air t o a space provided between the dummy disc which is partially peeled by the mechanical peeling device and the second reflective film to completely peel off the partially peeled dummy disc from the second reflective film.

4. An apparatus for manufacturing an optical disc as claimed in claim 3, wherein the air pressure peeling device includes a blow head that is positioned on the dummy disc side with respect to the attracted disc substrate side onto the disc cradle with a further space (S) thereof provided against the partially peeled dummy disc and the mechanical peeling device to supply the compressed air to the further space (S) and the space between the partially peeled dummy disc and the second reflective film to completely peel off the dummy disc from the second reflective film, the blow head having a suction device positioned on a part of the blow head defining the further space (S) to attract the dummy disc side thereonto, the completely peeled dummy disc attracted onto the suction device being expelled after the blow head completely peels off the dummy disc from the second reflective film.

5. An apparatus for manufacturing an optical disc as claimed in claim 4, wherein the mechanical peeling device includes a plurality of mutually divided wedge portions, each wedge portion having the mutually same triangular shape in cross section, positioned on at least the disc cradle on which the disc substrate side is attracted and whose common diameter is enabled to be expanded so that tips of the wedge portions are inserted into the space provided between the disc substrate and the dummy disc to partially peel off the dummy disc from the second reflective film, wherein the disc cradle includes at least one suction passage to suck the bonded dummy disc and disc substrate to its opening to attract the disc substrate side onto the cradle portion, and wherein the suction device includes: at least another suction passage to suck the completely peeled dummy disc to its opening and a suction pad positioned along the opening of the other suction passage to suck the dummy disc side onto a part of the blow head defining the other space (S).

6. An apparatus for manufacturing an optical disc comprising:
 a bonding device to bond a transparent disc substrate having two surfaces thereof on at least one of which a first information is recorded and a first reflective film is formed onto a dummy disc having similar surfaces thereof on at least one of which a second information is recorded and a second reflective film is formed via an adhesive layer, and
 an external force applying device to apply an external force between the dummy disc and the disc substrate through an integrated center hole penetrated through the dummy disc and the disc substrate at center portions thereof to peel off the dummy disc at a first interface between the dummy disc and the disc substrate, and wherein the external force applying device includes:
  a preliminary, partial peeling mechanism that is enabled to expand between the dummy disc and the disc substrate through the integrated center hole of the dummy disc substrate to partially peel off the dummy disc from the disc substrate; and
  a peeling mechanism that supplies a compressed air to a space provided between the partially peeled dummy disc and the disc substrate to completely peel off the dummy disc from the disc substrate.

7. An apparatus for manufacturing an optical disc as claimed in claim 6, wherein the preliminary, partial peeling mechanism includes: a disc cradle to receive the bonded disc substrate and dummy disc carried from the bonding device and to attract the disc substrate side onto its cradle portion with the dummy disc side exposed to the air.

8. An apparatus for manufacturing an optical disc as claimed in claim 7, further comprising: a turn table that is driven to be rotated intermittently to carry the dummy disc and the disc substrate at a plurality of predetermined intermittently stopped positions of the turn table, the turn table having an opening on one of the predetermined intermittently stopped positions; and further includes a drive mechanism that is driven to raise the preliminary, partial peeling mechanism through the disc cradle and the opening of the turn table to expand between the dummy disc and the disc substrate through the integrated center hole of the dummy disc and the disc substrate to partially peel off the dummy disc from the second reflective film and, thereafter, is driven to lower the preliminary, partial peeling mechanism to its lower position.

9. An apparatus for manufacturing an optical disc as claimed in claim 8, wherein the preliminary, partial peeling mechanism includes a plurality of mutually divided wedge portions, each wedge portion having mutually the same wedge shape in cross section and having mutually the same arc shape in cross section at a head thereof, positioned at the opening of the turn table and the disc cradle on which the bonded dummy disc and disc substrate is attracted and whose common outer peripheral diameter is expanded and tips of the wedge portions are inserted into the space provided between the disc substrate and the dummy disc to partially peel off the dummy disc from the second reflective film.

10. An apparatus for manufacturing an optical disc as claimed in claim 9, wherein the peeling mechanism includes: a compressed air supply passage through which a compressed air having an air pressure higher than the atmospheric pressure is supplied to the space between the partially peeled dummy disc and the second reflective film; and a pressure applying chamber formed on the integrated center hole penetrated through the dummy disc and the disc substrate and the space between the partially peeled dummy disc and the second reflective film and linked to the compressed air supply passage to receive the compressed air thereinto.

* * * * *